United States Patent
Fujimoto (10) Patent No.: US 7,268,954 B2
(45) Date of Patent: Sep. 11, 2007

(54) ZOOM LENS SYSTEM AND IMAGE PICKUP APPARATUS USING THE SAME

(75) Inventor: Makoto Fujimoto, Katsushika-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 11/189,183

(22) Filed: Jul. 25, 2005

(65) Prior Publication Data

US 2006/0023317 A1    Feb. 2, 2006

(30) Foreign Application Priority Data

Jul. 30, 2004 (JP) ............................. 2004-223788

(51) Int. Cl.
*G02B 15/14* (2006.01)
(52) U.S. Cl. ...................................... 359/676; 359/685
(58) Field of Classification Search ......... 359/676–692
See application file for complete search history.

(56) References Cited

U.S. PATENT DOCUMENTS 5,528,427 A    6/1996  Tanaka ....................... 359/683
5,585,969 A *  12/1996 Endo ........................... 359/683
6,061,180 A     5/2000  Hayakawa ................. 359/557
6,124,972 A     9/2000  Hayakawa ................. 359/557
6,462,885 B2   10/2002  Nishio ........................ 359/687
6,483,648 B1 * 11/2002  Yamanashi ................. 359/683
6,690,519 B2 *  2/2004  Ozaki ......................... 359/676
6,825,989 B2 * 11/2004  Uzawa et al. ............... 359/684

FOREIGN PATENT DOCUMENTS

| JP | 5-119260 A | 5/1993 |
| JP | 8-136862 A | 5/1996 |
| JP | 10-282413 A | 10/1998 |
| JP | 2001-166208 A | 6/2001 |

* cited by examiner

*Primary Examiner*—Mohammed Hasan
(74) *Attorney, Agent, or Firm*—Canon U.S.A. Inc IP Division (57) ABSTRACT

A zoom lens system comprising a multiple of lens units with various positive and negative powers that can, in at least one exemplary embodiment, be used to reduce ghost light.

17 Claims, 11 Drawing Sheets

ZOOM LENS SYSTEM AND IMAGE PICKUP APPARATUS USING THE SAME

BACKGROUND OF THE INVENTION

1. Field of the Invention

The present invention relates to a zoom lens system more particularly, but not exclusively, a zoom lens system that can be operatively connected to an image device.

2. Description of the Related Art

Hitherto, in the field of zoom lenses used for photographic cameras and camcorders, various zoom lenses using a rear focus system have been proposed. In the rear focus system, focusing is performed by moving a lens unit on the image side (opposite to the object side) of a first lens unit.

A conventional rear-focus zoom lens includes five lens units whose refractive powers are positive, negative, positive, negative, and positive, from the object side to the image side.

Figure 11:
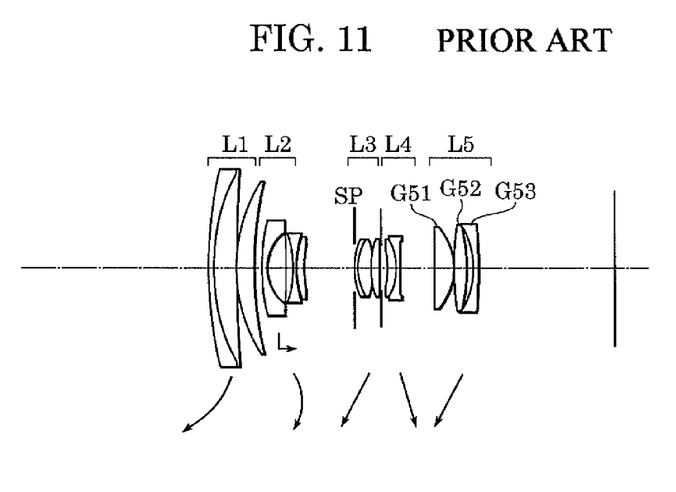
FIG. 11 illustrates a lens sectional view of a conventional zoom lens.

Japanese Patent Laid-Open No. 05-119260 (corresponding to U.S. Pat. No. 5,528,427) discusses a zoom lens including, from the object side to the image side, a first lens unit L1 having positive refractive power, a second lens unit L2 having negative refractive power, a third lens unit L3 having positive refractive power, a fourth lens unit L4 having negative refractive power, and a fifth lens unit L5 having positive refractive power, as shown in FIG. 11. The fifth lens unit L5 includes, from the object side to the image side, a lens G51 having positive refractive power, another lens G52 having positive refractive power, and another lens G53 having negative refractive power. Aberrations such as spherical aberration, coma aberration, and distortion generated in the fourth lens unit L4 are reduced by generating aberrations such as spherical aberration, coma aberration, and distortion in an air lens between the positive lens G52 and the negative lens G53. Thus, improved optical performance can be achieved throughout the entire zoom range.

Although this zoom lens has a simple lens configuration and improved optical performance, it has no image-stabilizer lens unit.

An image-stabilizer lens unit can have negative refractive power, which can reduce the diameter of the product including it.

Therefore, in the case of this zoom lens, the whole or part of the second lens unit L2 or the fourth lens unit L4 having negative refractive power can be an image-stabilizer lens unit.

However, if the second lens unit L2 is an image-stabilizer lens unit, the outside diameter of the image-stabilizer lens unit is large. This does not aid compactness. In addition, if the second lens unit L2 is an image-stabilizer lens unit, it is difficult to use the second lens unit L2 as a focusing unit.

On the other hand, if the fourth lens unit L4 is an image-stabilizer lens unit, the second lens unit L2 can be used as a focusing unit. In addition, the fourth lens unit L4 has the smallest lens diameter of all the lens units. There is no problem in terms of compactness.

However, in the image-stabilizer lens unit, the stabilization can be facilitated by reducing the coma aberration as well as the decentration aberration.

The coma aberration generated in the fourth lens unit L4 can, at least partially, compensate for the coma aberration generated in the fifth lens unit L5. Therefore, if the coma aberration generated in the fourth lens unit L4 is reduced, one can reduce the coma aberration generated in the fifth lens unit L5 accordingly.

That is to say, one can reduce the refractive power of the air lens between the lenses G52 and G53. Consequently, the difference between the radius of curvature of the image-side surface Ra of the lens G52 and the radius of curvature of the object-side surface Rb of the lens G53 can be small.

When the difference between the radiuses of curvature of the surfaces Ra and Rb, which form the air lens in the fifth lens unit L5, is small, the problem of a ghost image can occur.

Figure 12:
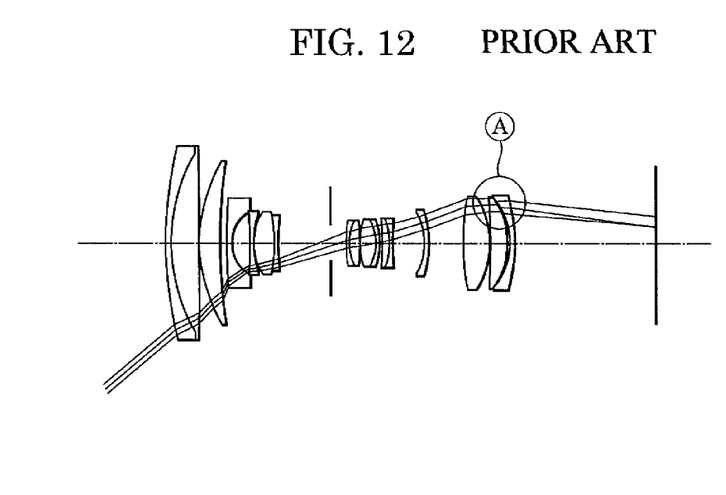
FIG. 12 illustrates an explanatory view of ghost light of the conventional zoom lens.
Figure 13:
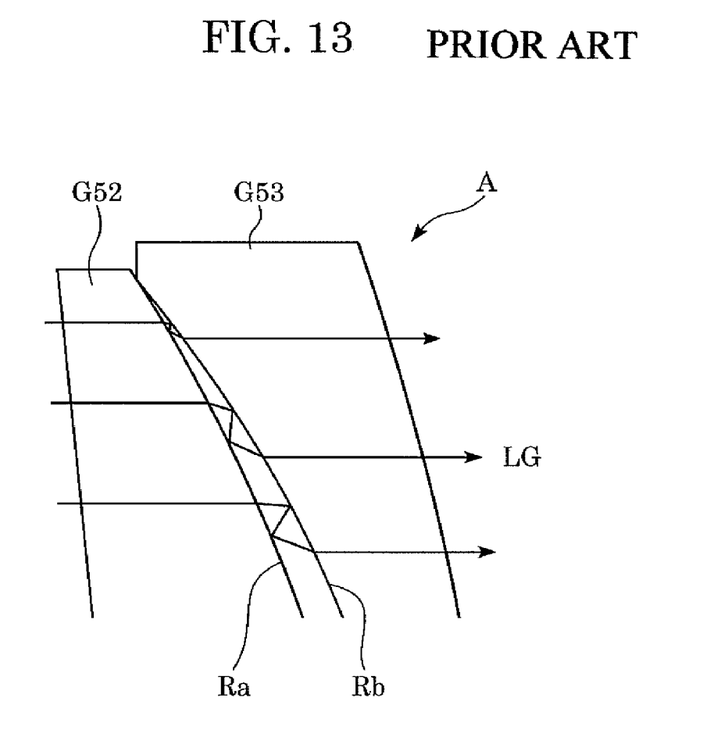
FIG. 13 illustrates an enlarged explanatory view of ghost light of the conventional zoom lens.

That is to say, light travels in the optical path shown in FIGS. 12 and 13 (undergoes surface reflections), which generates a ghost image. FIG. 13 is an enlarged view of part A of FIG. 12.

As shown in FIG. 13, light LG undergoes a multiple reflection between the surfaces Ra and Rb, is incident on the image plane, and becomes ghost light.

Depending on the position of a light source, the angle of incidence of the ghost light on each surface of the air lens can be more than 50 degrees. Therefore, reflectance is increased. An intensity of ghost light still exists at appreciable levels even if the surfaces Ra and Rb have an antireflection coating.

The air lens formed by the surfaces Ra and Rb can reduce the distortion as well as the coma aberration. If the refractive power is small, it is difficult to reduce the aberrations.

SUMMARY OF THE INVENTION

Exemplary embodiments are directed to a zoom lens system in which ghost light is reduced.

In at least one exemplary embodiment, a zoom lens system includes, from the object side to the image side, a first lens unit having positive refractive power, a second lens unit having negative refractive power, a third lens unit having positive refractive power, a fourth lens unit having negative refractive power, and a fifth lens unit having positive refractive power. When zooming, each lens unit can move. The fifth lens unit includes a lens having at least one aspherical surface and positive refractive power, and a combination lens.

Further features of the present invention will become apparent from the following description of exemplary embodiments (with reference to the attached drawings).

DESCRIPTION OF THE EMBODIMENTS

The following description of exemplary embodiment(s) is merely illustrative in nature and is in no way intended to limit the invention, its application, or uses.

Exemplary embodiments can be operatively connected to various imaging devices (e.g., electronic cameras, camcorders, digital still cameras, film cameras, broadcast cameras, other imaging devices as known by one of ordinary skill, and equivalents) forming imaging systems.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g., glass, Si). Additionally the actual size of the lens may not be discussed however any size from macro lenses to nano lenses are intended to lie within the scope of exemplary embodiments (e.g., lenses with diameters of nanometer size, micro size, centimeter size, and meter sizes).

Additionally exemplary embodiments are not limited to visual imaging devices (e.g., optical photographic systems), for example the system can be designed for use with infrared and other wavelength imaging systems. Additionally, exemplary embodiments can be used with non-digital systems as well as digital systems (e.g., photographic systems using CCDS).

Notice that similar reference numerals and letters refer to similar items in the following figures, and thus once an item is defined in one figure, it may not be discussed or further defined in the following figures.

Exemplary embodiments of a zoom lens system and an image pickup apparatus using a zoom lens in accordance with exemplary embodiments are described below.

Figure 1:
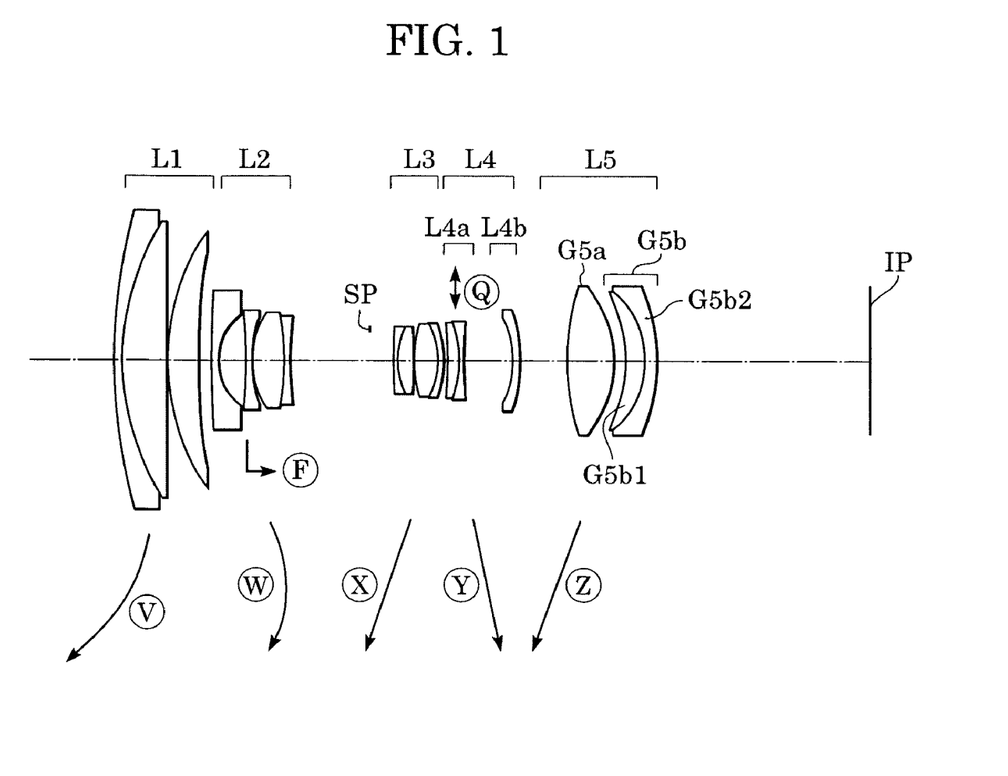
FIG. 1 illustrates a lens sectional view of the zoom lens of exemplary embodiment 1.
Figure 2A:
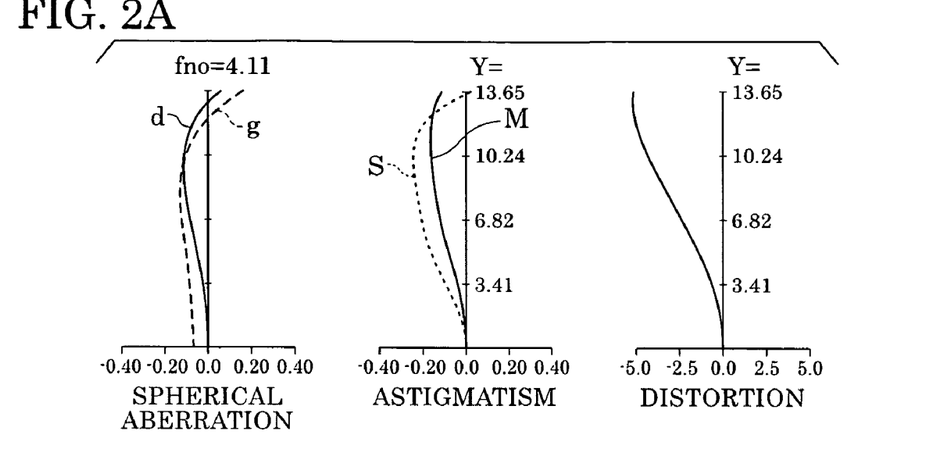
FIGS. 2A, 2B, and 2C illustrate aberration diagrams of the zoom lens of exemplary embodiment 1.
Figure 2B:
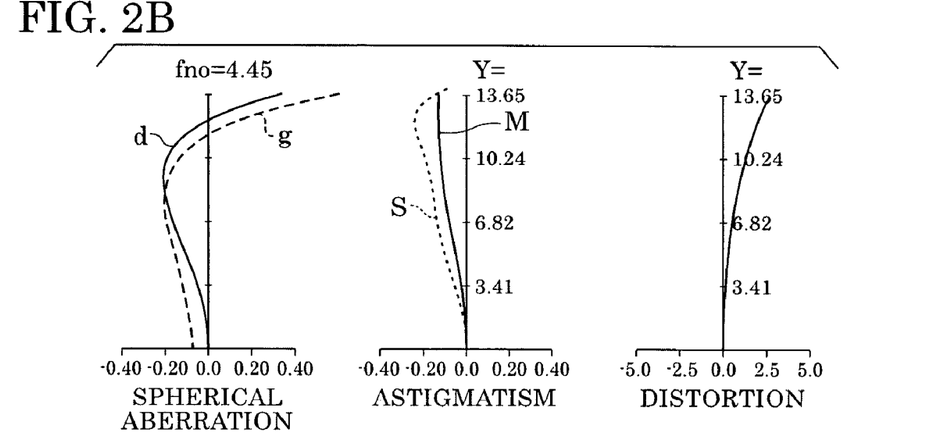
Figure 2C:
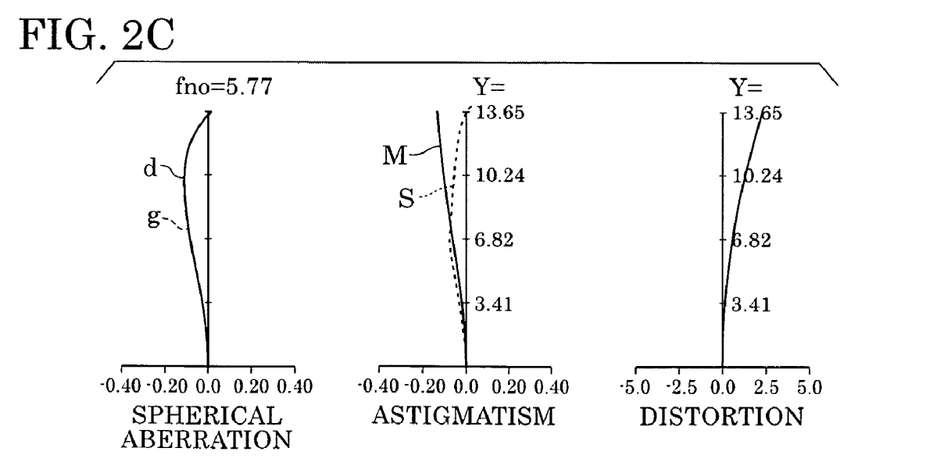

FIG. 1 illustrates a lens sectional view of the zoom lens of exemplary embodiment 1 at the wide-angle end. FIGS. 2A, 2B, and 2C illustrate aberration diagrams of the zoom lens of exemplary embodiment 1 at the wide-angle end, the middle zoom position, and the telephoto end respectively. The reference characters d and g represent the d-line and g-line, respectively, where the lateral chromatic aberration is indicated by the g-line and the d-line. Reference characters M and S denote the meridional image plane and the sagittal image plane respectively. Reference character Y denotes the image height. Reference character fno denotes the F-number.

Figure 3:
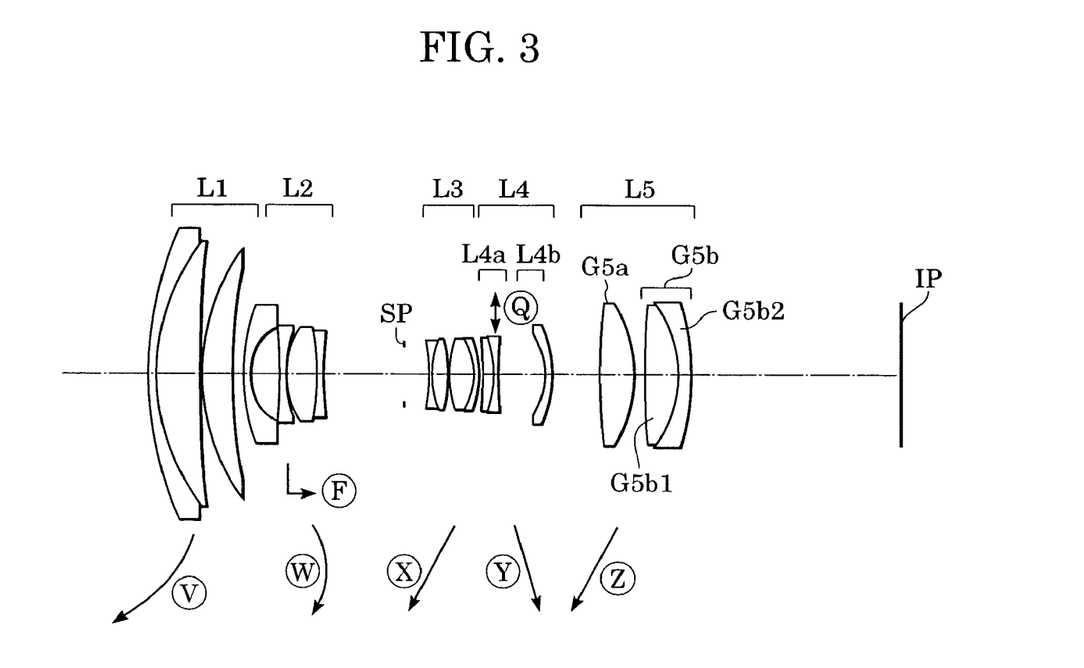
FIG. 3 illustrates a lens sectional view of the zoom lens of exemplary embodiment 2.
Figure 4A:
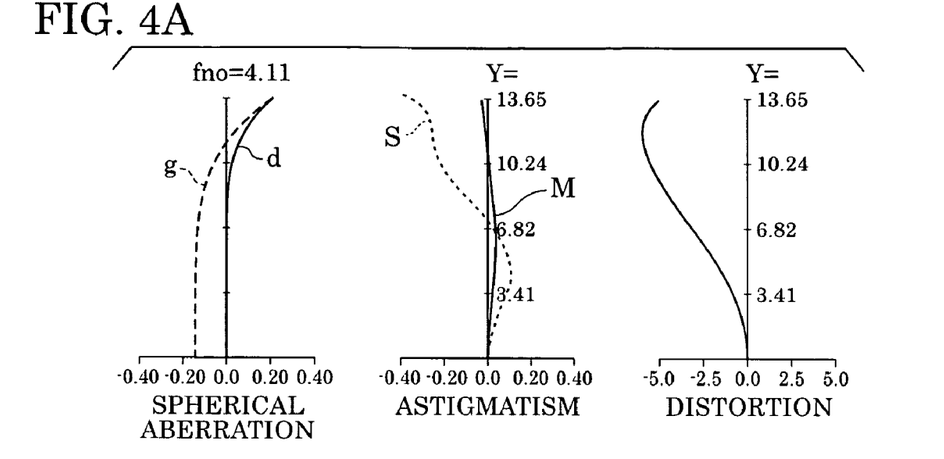
FIGS. 4A, 4B, and 4C illustrate aberration diagrams of the zoom lens of exemplary embodiment 2.
Figure 4B:
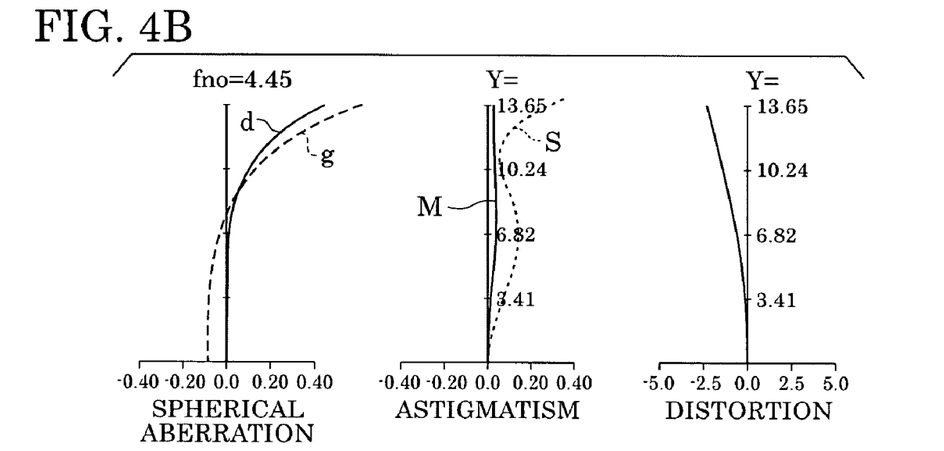
Figure 4C:
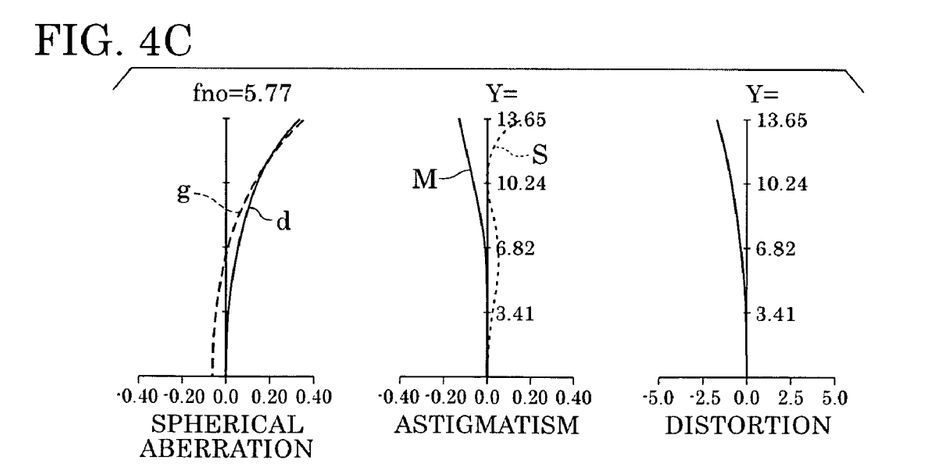

FIG. 3 illustrates a lens sectional view of the zoom lens of exemplary embodiment 2 at the wide-angle end. FIGS. 4A, 4B, and 4C illustrate aberration diagrams of the zoom lens of exemplary embodiment 2 at the wide-angle end, the middle zoom position, and the telephoto end respectively.

Figure 5:
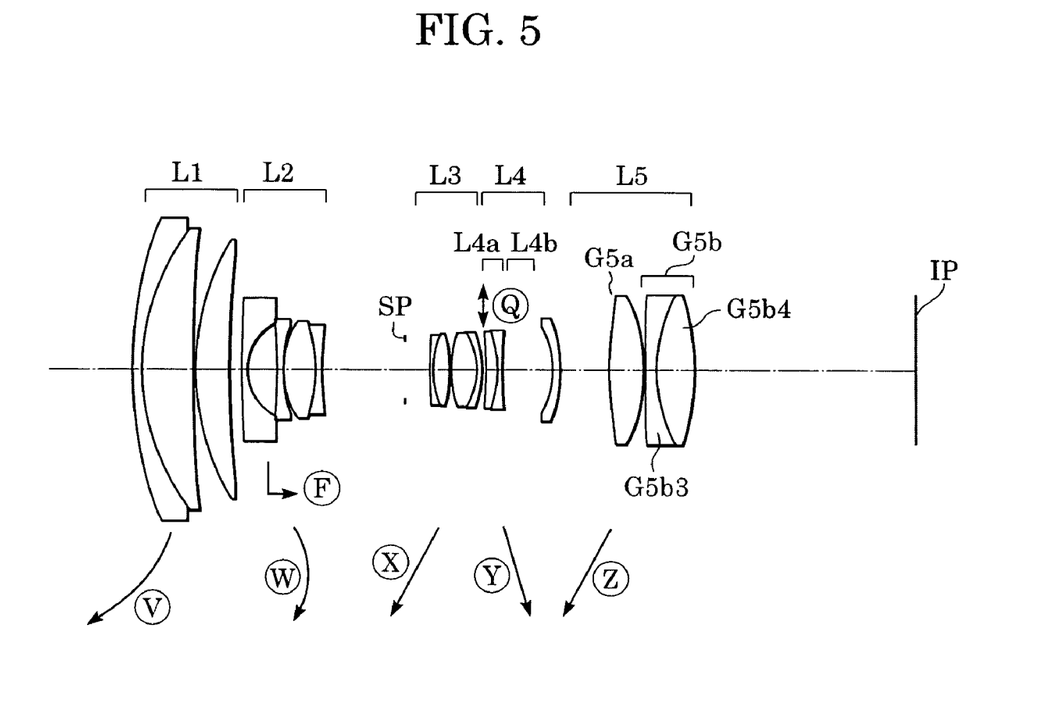
FIG. 5 illustrates a lens sectional view of the zoom lens of exemplary embodiment 3.
Figure 6A:
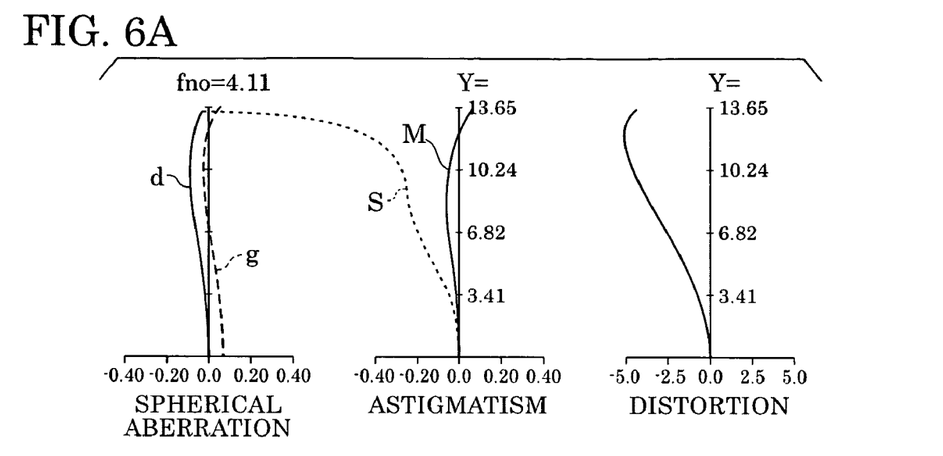
FIGS. 6A, 6B, and 6C illustrate aberration diagrams of the zoom lens of exemplary embodiment 3.
Figure 6B:
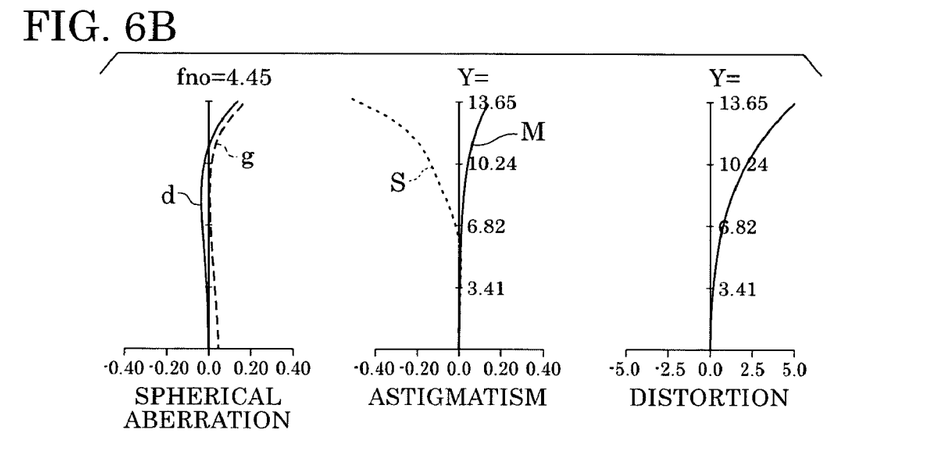
Figure 6C:
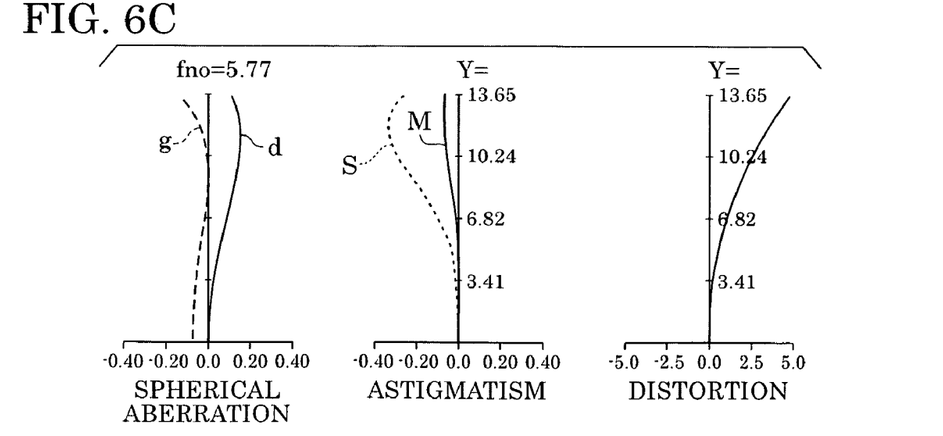

FIG. 5 illustrates a lens sectional view of the zoom lens of exemplary embodiment 3 at the wide-angle end. FIGS. 6A, 6B, and 6C illustrate aberration diagrams of the zoom lens of exemplary embodiment 3 at the wide-angle end, the middle zoom position, and the telephoto end respectively.

Figure 7:
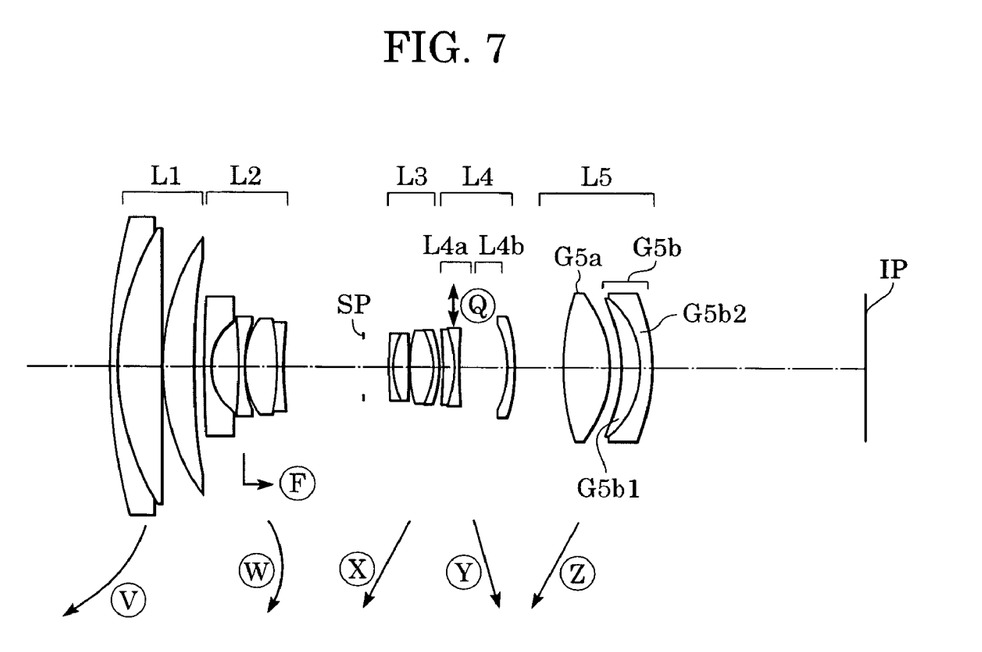
FIG. 7 illustrates a lens sectional view of the zoom lens of exemplary embodiment 4.
Figure 8A:
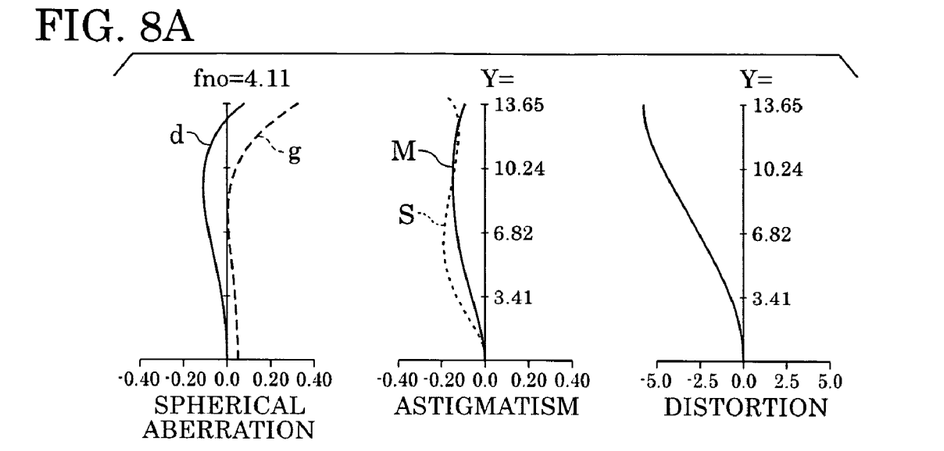
FIGS. 8A, 8B, and 8C illustrate aberration diagrams of the zoom lens of exemplary embodiment 4.
Figure 8B:
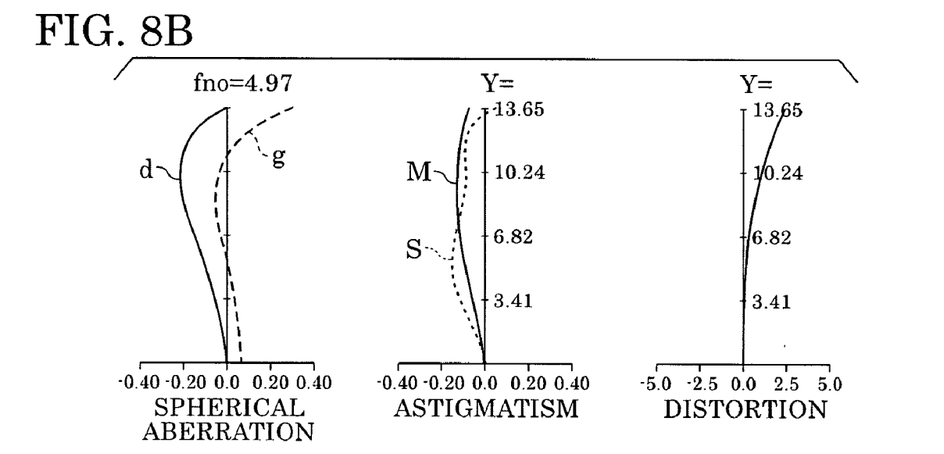
Figure 8C:
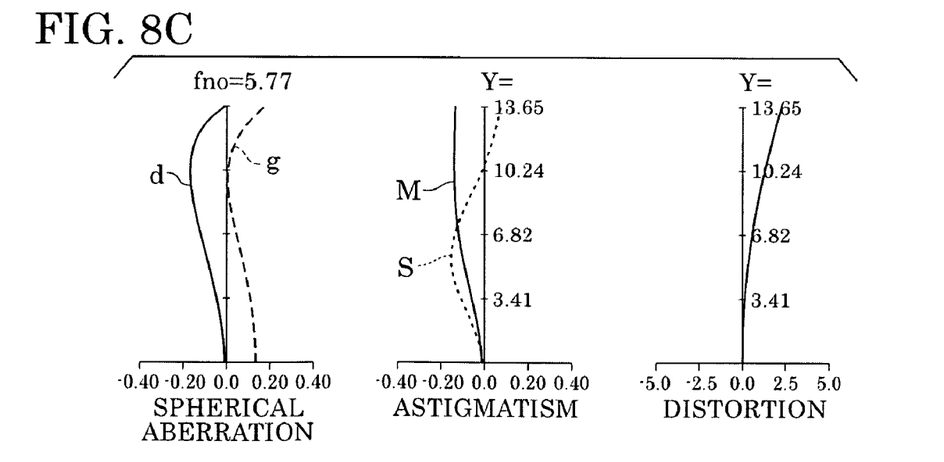

FIG. 7 illustrates a lens sectional view of the zoom lens of exemplary embodiment 4 at the wide-angle end. FIGS. 8A, 8B, and 8C illustrate aberration diagrams of the zoom lens of exemplary embodiment 4 at the wide-angle end, the middle zoom position, and the telephoto end respectively.

Figure 9:
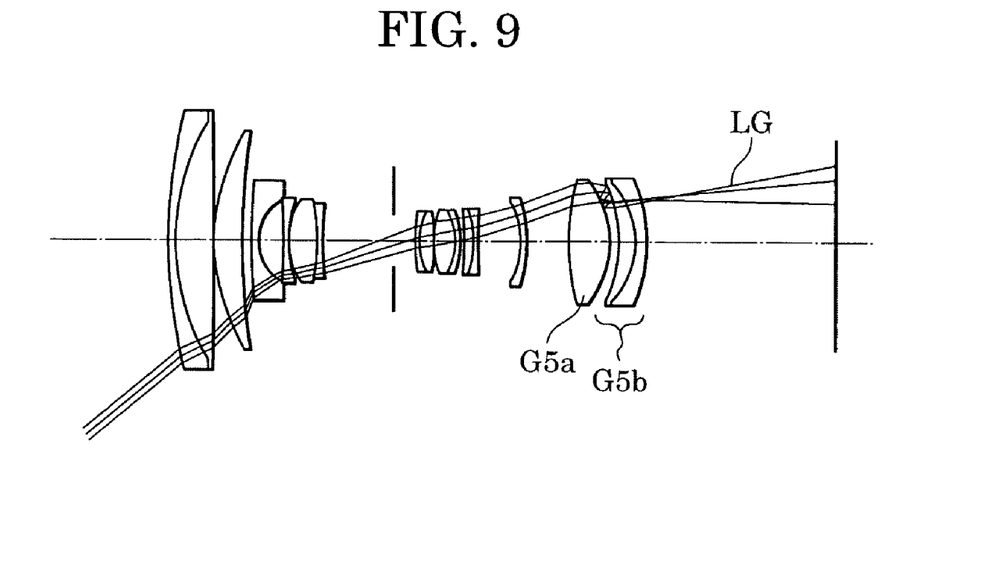
FIG. 9 illustrates an explanatory view of ghost light.

FIG. 9 illustrates an explanatory view of the formation of ghost light.

Figure 10:
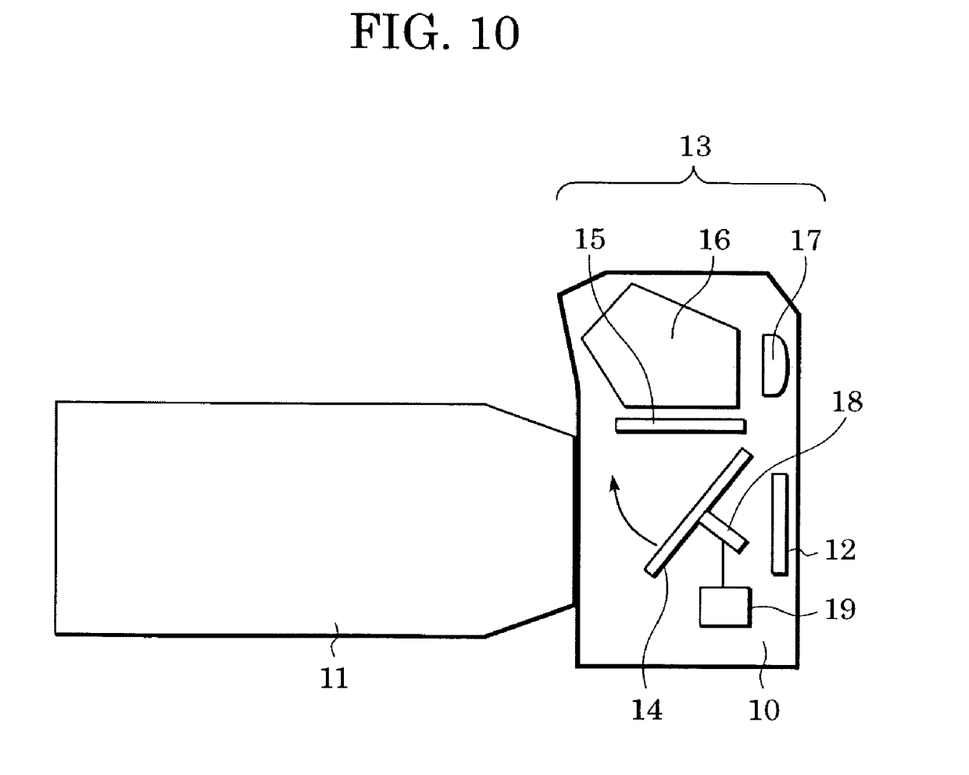
FIG. 10 illustrates a schematic view of an image pickup apparatus.

FIG. 10 illustrates a schematic view of a single-lens reflex camera (image pickup apparatus) having the zoom lens system of at least one exemplary embodiment.

The zoom lens of exemplary embodiments can be a photographic lens system used in an image pickup apparatus. In lens sectional views, the left side is the object side (the front), and the right side is the image side (the rear). In lens sectional views, reference character L1 denotes a first lens unit which can have a positive refractive power (optical power, which is the inverse of the focal length), reference character L2 denotes a second lens unit which can have a negative refractive power, reference character L3 denotes a third lens unit which can have a positive refractive power, reference character L4 denotes a fourth lens unit which can have a negative refractive power, and reference character L5 denotes a fifth lens unit which can have a positive refractive power.

Reference character SP denotes an aperture stop, which can be located on the object side of the third lens unit L3, and can move independently of the lens units when zooming.

Reference character IP denotes an image plane. The image plane can correspond to the imaging surface of an image device (e.g., a solid-state image sensor (photoelectric transducer), a CCD sensor, a CMOS sensor, other imaging surfaces as known by one of ordinary skill in the relevant art, and equivalents). For example in the case of a silver salt camera, the image plane corresponds to the film surface.

In the exemplary embodiments, the wide-angle end and the telephoto end refer to the zoom positions where the lens unit is at either end of its mechanically movable range on the optical axis.

In each embodiment, when zooming from the wide-angle end to the telephoto end, the lens units can move as shown by arrows in each lens sectional view (V, W, X, Y, Z). That is to say, the first lens unit L1 can move (V) on the optical axis toward the object side such that the distance between the first lens unit L1 and the second lens unit L2 increases.

The second lens unit L2 can move (W) on the optical axis in a curve convex toward the image side or the object side at different points along its path. The third lens unit L3 can move (X) on the optical axis toward the object side such that the distance between the second lens unit L2 and the third lens unit L3 decreases.

The fourth lens unit L4 can move (Y) on the optical axis toward the image side such that the distance to the third lens unit L3 increases.

The fifth lens unit L5 can move (Z) on the optical axis toward the object side such that the distance to the fourth lens unit L4 decreases.

In the exemplary embodiments, the focusing from an object at infinity, or a large distance, to an object at a short distance can be performed by moving (F) the second lens unit L2 on the optical axis toward the image side, as shown by an arrow in each lens sectional view.

The fourth lens unit L4 can include a first lens subunit L4a which can have a negative refractive power and a second lens subunit L4b which can have a negative refractive power.

The first lens subunit L4a can be an image-stabilizer lens unit, which can move (Q) such that it's motion has a component perpendicular to the optical axis, and changes the image location of the entire zoom lens system in a direction that has a component perpendicular to the optical axis.

The first lens subunit L4a can be a combination lens which can include a positive lens and a negative lens. The second lens subunit L4b can be a single negative lens.

In the exemplary embodiments, the second lens subunit L4b may be an image-stabilizer lens unit. Alternatively, the entire fourth lens unit L4 may be an image-stabilizer lens unit.

In the exemplary embodiments, configuring the image-stabilizer lens unit as described above can improve image-stabilizing sensitivity (vibration control sensitivity) and can decrease the decentration lateral chromatic aberration generated during image stabilization.

The fifth lens unit L5 can include a positive lens which can have at least one aspherical surface (aspherical lens) G5a, and a combination lens G5b. Such configuration of the fifth lens unit L5 can be used in the image stabilization performed by the whole or part of the fourth lens unit L4. That is to say, in at least one exemplary embodiment, the lenses G52 and G53 of the conventional zoom lens illustrated in FIG. 11 can be, combined into a combination lens G5b reducing the coma aberration generated in the fifth lens unit L5. To reduce some aberrations such as distortion, the lens G5a can be provided with an aspherical surface. To reduce coma aberration, the difference between the radius of curvature of the most object-side surface and the radius of curvature of the most image-side surface of the combination lens G5b can be small. Specifically, both the most object-side surface and the most image-side surface of the combination lens G5b can be convex toward the image side.

In exemplary embodiments 1 and 4 shown in FIGS. 1 and 7 respectively, the fifth lens unit L5 can include, from the object side to the image side, a positive lens G5a and a combination lens G5b which can have a small negative refractive power. Both lens surfaces (on the object side and image side) of the lens G5a (e.g., with positive power) can be aspherical surfaces. The combination lens G5b can include a positive lens G5b1 and a negative lens G5b2.

In exemplary embodiment 4, the lens G5a (e.g., with positive power) can be aspherical, for example a glass mold aspherical lens formed of a glass material having an Abbe number of 70 (for example, GFK70 (trade name) available from Sumita Optical Glass, Inc.). Note, as mentioned earlier, other materials and optical powers can be used and are intended to be within the scope of exemplary embodiments.

When a low dispersion material (e.g., glass) or an extraordinary dispersion material is used for the lens G5a, the lateral chromatic aberration at the wide-angle end can be improved.

In exemplary embodiment 2 illustrated in FIG. 3, the fifth lens unit L5 can include, from the object side to the image side, a positive lens G5a and a combination lens G5b which can have a small positive refractive power. The object-side surface of the positive lens G5a can be an aspherical surface. The combination lens G5b can include, from the object side to the image side, a positive lens G5b1 and a negative lens G5b2.

In exemplary embodiment 3 illustrated in FIG. 5, the fifth lens unit L5 can include, from the object side to the image side, a positive lens G5a and a combination lens G5b having small positive refractive power. The image-side surface of the positive lens G5a can be an aspherical surface. The combination lens G5b can include, from the object side to the image side, a negative lens G5b3 and a positive lens G5b4.

As described above, in exemplary embodiments, an aspherical lens can be disposed in the fifth lens unit L5, thereby reducing the decentration coma aberration generated during image stabilization. The aspherical surface of the aspherical lens may be any one of a ground aspherical surface, a glass mold aspherical surface, an aspherical surface formed of resin on the surface of a spherical lens, a plastic mold lens, other aspherical surfaces as known by one of ordinary skill in the relevant art, and equivalents.

In the exemplary embodiments, on the object side of the first lens unit L1 or on the image side of the fifth lens unit L5, an optical filter or a lens unit having small refractive power may be added.

A teleconverter lens or a wideconverter lens may be added on the object side or the image side of the first lens unit.

In exemplary embodiments, a radius of curvature of the image-side surface of the lens G5a in the fifth lens unit L5 (R1) and a radius of curvature of the object-side surface of the combination lens G5b in the fifth lens unit L5 (R2) can satisfy the following condition:

$$0.1 \le \left| \frac{R1 - R2}{R1 + R2} \right| \qquad (1)$$

Condition 1 represents a condition to reduce ghosting from occurring between the lens G5a and the combination lens G5b. When the difference between the radius of curvature of the image-side surface of the lens G5a and that of the object-side surface of the combination lens G5b is small, ghosting LG illustrated in FIG. 9 tends to occur between the lens G5a and the combination lens G5b. The radius of curvature of the image-side surface of the lens G5a and that of the object-side surface of the combination lens G5b can be set such that they can satisfy condition 1, thereby reducing the ghosting based on the light reflected by these surfaces.

A refractive power of the fifth lens unit L5 ($\phi 5$) and a refractive power of the combination lens G5b ($\phi 5b$) can satisfy the following condition:

$$\left| \frac{\phi 5b}{\phi 5} \right| < 0.5 \qquad (2)$$

Condition 2 represents a condition to reduce the coma aberration from occurring in the combination lens G5b. The refractive powers of the fifth lens unit L5 and the combination lens G5b can be set such that they can satisfy condition 2, thereby reducing the coma aberration occurring in the combination lens G5b.

Additional ranges are possible in accordance with various exemplary embodiments, for example:

$$0.15 \le \left| \frac{R1 - R2}{R1 + R2} \right| \qquad (1a)$$

$$\left| \frac{\phi 5b}{\phi 5} \right| < 0.45 \qquad (2a)$$

Various upper and lower limits of the ranges are possible within various exemplary embodiments, for example the upper limit of condition 1 and the lower limit of condition 2 can be:

$$\left|\frac{R1-R2}{R1+R2}\right| \leq 3 \quad (1b)$$

$$0.02 < \left|\frac{\phi 5b}{\phi 5}\right| \quad (2b)$$

As described above, a zoom lens according to at least one exemplary embodiment can have an increased zoom ratio (about 4-5) including the wide-angle range, and a predetermined decentration sensitivity for improved vibration compensation (image stabilization). In addition, when the zoom lens is used for an image pickup apparatus, the image pickup apparatus can be reduced in size, and an improved image can be obtained during vibration compensation.

Numerical embodiments 1 to 4 corresponding to exemplary embodiments 1 to 4, respectively, will be shown below. In each numerical embodiment, i shows the order of surfaces from the object side, ri shows the radius of curvature of each surface, di shows the distance between the ith surface and the (i+1)th surface (the member thickness or the air space), and ni and vi show the refractive index and the Abbe number for the d line respectively. When a displacement in the direction of the optical axis at a height from the optical axis (h) referenced to the surface vertex is X, the aspherical shape is represented by the following formula:

$$X = \frac{(1/R)H^2}{1+\sqrt{1-(1+K)(H/R)^2}} + BH^4 + CH^6 + DH^8 + EH^{10} + FH^{12}$$

where R is the paraxial radius of curvature, K is the conical constant, and B, C, D, E, and F are the aspherical coefficients.

Incidentally, "e-X" refers to "×10$^{-x}$". Reference character f denotes the focal length, reference character Fno denotes the F-number, and reference character ω denotes the half angle of view.

Table 1 shows the relation between conditions 1 and 2 and numerical values in numerical embodiments 1 to 4.

(Numerical Embodiment 1)

f = 17.55~82.48   fno. = 1:4.0~5.77   2ω = 75.7°~18.8°

| | | | |
|---|---|---|---|
| r1 = 103.770 | d1 = 1.40 | n1 = 1.8467 | v1 = 23.9 |
| r2 = 47.288 | d2 = 7.75 | n2 = 1.6031 | v2 = 60.6 |
| r3 = ∞ | d3 = 0.12 | | |
| r4 = 42.152 | d4 = 5.60 | n3 = 1.7340 | v3 = 51.5 |
| r5 = 133.136 | d5 = variable | | |
| r6 = 154.643 | d6 = 1.20 | n4 = 1.7725 | v4 = 49.6 |
| r7 = 10.222 | d7 = 5.02 | | |
| r8 = −92.741 | d8 = 1.00 | n5 = 1.8830 | v5 = 40.8 |
| r9 = 26.583 | d9 = 0.15 | | |
| r10 = 16.820 | d10 = 5.50 | n6 = 1.8052 | v6 = 25.4 |
| r11 = −42.034 | d11 = 0.05 | | |
| r12 = −39.123 | d12 = 1.00 | n7 = 1.8040 | v7 = 46.6 |
| r13 = 52.275 | d13 = variable | | |
| r14 = (stop) | d14 = variable | | |
| r15 = 47.384 | d15 = 0.80 | n8 = 1.7200 | v8 = 50.2 |
| r16 = 13.423 | d16 = 2.85 | n9 = 1.4875 | v9 = 70.2 |
| r17 = −69.538 | d17 = 0.15 | | |
| r18 = 22.286 | d18 = 4.30 | n10 = 1.4875 | v10 = 70.2 |
| r19 = −11.903 | d19 = 0.90 | n11 = 1.6889 | v11 = 31.1 |
| r20 = −18.297 | d20 = variable | | |
| r21 = −64.282 | d21 = 2.00 | n12 = 1.8467 | v12 = 23.9 |
| r22 = −17.706 | d22 = 0.80 | n13 = 1.7620 | v13 = 40.1 |
| r23 = 79.572 | d23 = 8.70 | | |
| r24 = −17.203 | d24 = 1.20 | n14 = 1.6031 | v14 = 60.6 |
| r25 = −31.365 | d25 = variable | | |
| *r26 = 45.342 | d26 = 8.25 | n15 = 1.5831 | v15 = 59.4 |
| *r27 = −18.940 | d27 = 2.01 | | |
| r28 = −28.057 | d28 = 3.50 | n16 = 1.4875 | v16 = 70.2 |
| r29 = −17.051 | d29 = 2.10 | n17 = 1.8467 | v17 = 23.9 |
| r30 = −34.364 | | | |

| focal length | 17.55 | 35 | 82.48 |
|---|---|---|---|
| d5 = | 2.15 | 14.60 | 29.74 |
| d13 = | 14.25 | 8.92 | 2.92 |
| d14 = | 4.28 | 1.72 | 1.74 |
| d20 = | 0.80 | 5.17 | 8.72 |
| d25 = | 8.51 | 4.14 | 0.59 | aspherical coefficients

| | surface r26 | surface r27 |
|---|---|---|
| K | 2.291E+00 | −1.619E−01 |
| B | −7.384E−06 | 1.514E−05 |
| C | 9.674E−09 | 3.849E−08 |
| D | −1.371E−10 | −1.638E−10 |
| E | 2.396E−13 | 3.147E−13 |
| F | 8.332E−16 | 1.097E−15 |

(Numerical Embodiment 2)

f = 17.55~82.49   fno. = 1:4.0~5.77   2ω = 75.7°~18.8°

| | | | |
|---|---|---|---|
| r1 = 70.090 | d1 = 1.40 | n1 = 1.8467 | v1 = 23.8 |
| r2 = 40.670 | d2 = 7.75 | n2 = 1.6031 | v2 = 60.6 |
| r3 = 245.554 | d3 = 0.12 | | |
| r4 = 38.039 | d4 = 5.60 | n3 = 1.7340 | v3 = 51.5 |
| r5 = 95.781 | d5 = variable | | |
| r6 = 37.381 | d6 = 1.20 | n4 = 1.7725 | v4 = 49.6 |
| r7 = 8.805 | d7 = 5.02 | | |
| r8 = −63.493 | d8 = 1.00 | n5 = 1.8830 | v5 = 40.8 |
| r9 = 34.473 | d9 = 0.15 | | |
| r10 = 16.938 | d10 = 5.50 | n6 = 1.8052 | v6 = 25.4 |
| r11 = −90.122 | d11 = 0.72 | | |
| r12 = −28.710 | d12 = 1.00 | n7 = 1.8040 | v7 = 46.6 |
| r13 = 1023.879 | d13 = variable | | |
| r14 = (stop) | d14 = variable | | |
| r15 = −64.120 | d15 = 0.80 | n8 = 1.7200 | v8 = 50.2 |
| r16 = 16.736 | d16 = 2.85 | n9 = 1.4875 | v9 = 70.2 |
| r17 = −21.455 | d17 = 0.15 | | |
| r18 = 21.220 | d18 = 4.30 | n10 = 1.4875 | v10 = 70.2 |
| r19 = −11.251 | d19 = 0.90 | n11 = 1.6889 | v11 = 31.1 |
| r20 = −17.478 | d20 = variable | | |
| r21 = −253.454 | d21 = 2.00 | n12 = 1.8467 | v12 = 23.9 |
| r22 = −17.453 | d22 = 0.80 | n13 = 1.7620 | v13 = 40.1 |
| r23 = 39.012 | d23 = 8.70 | | |
| r24 = −13.222 | d24 = 1.20 | n14 = 1.6031 | v14 = 60.6 |
| r25 = −20.538 | d25 = variable | | |
| *r26 = 111.866 | d26 = 6.00 | n15 = 1.5831 | v15 = 59.4 |
| r27 = −27.129 | d27 = 2.01 | | |
| r28 = 111.912 | d28 = 6.00 | n16 = 1.4875 | v16 = 70.2 |
| r29 = −22.245 | d29 = 2.10 | n17 = 1.8467 | v17 = 23.8 |
| r30 = −51.380 | | | |

| focal length | 17.55 | 35 | 82.49 |
|---|---|---|---|
| d5 = | 2.15 | 14.60 | 29.74 |
| d13 = | 14.25 | 8.92 | 2.92 |
| d14 = | 4.28 | 1.72 | 1.74 |
| d20 = | 0.80 | 5.17 | 8.72 |
| d25 = | 8.51 | 4.14 | 0.59 | aspherical coefficients

| | surface r26 |
|---|---|
| K | −1.026E+01 |
| B | −2.115E−06 |
| C | 2.291E−08 |

-continued

|   |   |
|---|---|
| D | −2.042E−10 |
| E | 7.843E−13 |
| F | −1.184E−15 |

(Numerical Embodiment 3)

f = 17.55~82.49   fno. = 1:4.0~5.77   2ω = 75.7°~18.8°

| | | | |
|---|---|---|---|
| r1 = 79.362 | d1 = 1.40 | n1 = 1.7552 | ν1 = 27.5 |
| r2 = 39.792 | d2 = 9.45 | n2 = 1.6204 | ν2 = 60.3 |
| r3 = 390.709 | d3 = 0.12 | | |
| r4 = 45.828 | d4 = 5.81 | n3 = 1.6204 | ν3 = 60.3 |
| r5 = 196.333 | d5 = variable | | |
| r6 = 161.915 | d6 = 1.20 | n4 = 1.6204 | ν4 = 60.3 |
| r7 = 9.380 | d7 = 4.96 | | |
| r8 = −55.708 | d8 = 1.00 | n5 = 1.7440 | ν5 = 44.8 |
| r9 = 21.874 | d9 = 0.15 | | |
| r10 = 14.785 | d10 = 5.50 | n6 = 1.7283 | ν6 = 28.5 |
| r11 = −26.225 | d11 = 0.31 | | |
| r12 = −20.799 | d12 = 1.00 | n7 = 1.7440 | ν7 = 44.8 |
| r13 = 64.414 | d13 = variable | | |
| r14 = (stop) | d14 = variable | | |
| r15 = 235.624 | d15 = 0.80 | n8 = 1.7205 | ν8 = 34.7 |
| r16 = 18.372 | d16 = 2.85 | n9 = 1.4875 | ν9 = 70.2 |
| r17 = −27.980 | d17 = 0.15 | | |
| r18 = 24.124 | d18 = 4.30 | n10 = 1.4875 | ν10 = 70.2 |
| r19 = −12.833 | d19 = 0.90 | n11 = 1.7440 | ν11 = 44.8 |
| r20 = −19.376 | d20 = variable | | |
| r21 = −64.282 | d21 = 2.00 | n12 = 1.8467 | ν12 = 23.9 |
| r22 = −17.706 | d22 = 0.80 | n13 = 1.7620 | ν13 = 40.1 |
| r23 = 79.572 | d23 = 8.70 | | |
| r24 = −17.203 | d24 = 1.20 | n14 = 1.6031 | ν14 = 60.6 |
| r25 = −31.365 | d25 = variable | | |
| r26 = 61.230 | d26 = 6.00 | n15 = 1.5831 | ν15 = 59.4 |
| *r27 = −28.797 | d27 = 0.20 | | |
| r28 = 669.294 | d28 = 2.10 | n16 = 1.4875 | ν16 = 70.2 |
| r29 = 25.361 | d29 = 6.50 | n17 = 1.8467 | ν17 = 23.9 |
| r30 = −44.342 | | | |

| focal length | 17.55 | 35 | 82.49 |
|---|---|---|---|
| d5 = | 2.15 | 14.60 | 29.74 |
| d13 = | 14.25 | 8.92 | 2.92 |
| d14 = | 4.28 | 1.72 | 1.74 |
| d20 = | 0.80 | 5.17 | 8.72 |
| d25 = | 8.51 | 4.13 | 0.59 | aspherical coefficients

| | surface r27 |
|---|---|
| K | 4.827E−01 |
| B | 1.509E−05 |
| C | 2.710E−09 |
| D | 1.586E−10 |
| E | −1.069E−12 |
| F | 2.586E−15 |

(Numerical Embodiment 4)

f = 17.55~82.48   fno. = 1:4.0~5.77   2ω = 75.7°~18.8°

| | | | |
|---|---|---|---|
| r1 = 103.770 | d1 = 1.40 | n1 = 1.8467 | ν1 = 23.9 |
| r2 = 47.288 | d2 = 7.75 | n2 = 1.6031 | ν2 = 60.6 |
| r3 = ∞ | d3 = 0.12 | | |
| r4 = 42.152 | d4 = 5.60 | n3 = 1.7340 | ν3 = 51.5 |
| r5 = 133.136 | d5 = variable | | |
| r6 = 154.643 | d6 = 1.20 | n4 = 1.7725 | ν4 = 49.6 |
| r7 = 10.222 | d7 = 5.02 | | |
| r8 = −92.741 | d8 = 1.00 | n5 = 1.8830 | ν5 = 40.8 |
| r9 = 26.583 | d9 = 0.15 | | |
| r10 = 16.820 | d10 = 5.50 | n6 = 1.8052 | ν6 = 25.4 |
| r11 = −42.034 | d11 = 0.05 | | |
| r12 = −39.123 | d12 = 1.00 | n7 = 1.8040 | ν7 = 46.6 |
| r13 = 52.275 | d13 = variable | | |
| r14 = (stop) | d14 = variable | | |
| r15 = 47.384 | d15 = 0.80 | n8 = 1.7200 | ν8 = 50.2 |
| r16 = 13.423 | d16 = 2.85 | n9 = 1.4875 | ν9 = 70.2 |
| r17 = −69.538 | d17 = 0.15 | | |
| r18 = 22.286 | d18 = 4.30 | n10 = 1.4875 | ν10 = 70.2 |
| r19 = −11.903 | d19 = 0.90 | n11 = 1.6889 | ν11 = 31.1 |
| r20 = −18.297 | d20 = variable | | |
| r21 = −64.282 | d21 = 2.00 | n12 = 1.8467 | ν12 = 23.9 |
| r22 = −17.706 | d22 = 0.80 | n13 = 1.7620 | ν13 = 40.1 |
| r23 = 79.572 | d23 = 8.70 | | |
| r24 = −17.203 | d24 = 1.20 | n14 = 1.6031 | ν14 = 60.6 |
| r25 = −31.365 | d25 = variable | | |
| *r26 = 45.229 | d26 = 8.25 | n15 = 1.5691 | ν15 = 71.3 |
| *r27 = −18.758 | d27 = 2.01 | | |
| r28 = −29.881 | d28 = 3.50 | n16 = 1.5174 | ν16 = 52.4 |
| r29 = −17.406 | d29 = 2.10 | n17 = 1.7847 | ν17 = 25.7 |
| r30 = −39.632 | | | |

| focal length | 17.55 | 35 | 82.48 |
|---|---|---|---|
| d5 = | 2.15 | 14.60 | 29.74 |
| d13 = | 14.25 | 8.92 | 2.92 |
| d14 = | 4.28 | 1.72 | 1.74 |
| d20 = | 0.80 | 5.17 | 8.72 |
| d25 = | 8.51 | 4.14 | 0.59 | aspherical coefficients

| | surface r26 | surface r27 |
|---|---|---|
| K | 2.051E+00 | −1.619E−01 |
| B | −1.185E−05 | 1.316E−05 |
| C | 5.933E−08 | 8.793E−08 |
| D | −8.805E−10 | −7.941E−10 |
| E | 4.935E−12 | 3.942E−12 |
| F | −1.351E−14 | −9.874E−15 |

TABLE 1

| | Condition 1 | | | Condition 2 |
|---|---|---|---|---|
| | $\left|\dfrac{R1 - R2}{R1 + R2}\right|$ | φ5 | φ5b | $\left|\dfrac{\phi 5b}{\phi 5}\right|$ |
| Numerical Embodiment 1 | 0.19 | 34.07 | −79.65 | 0.43 |
| Numerical Embodiment 2 | 1.64 | 33.04 | 204.15 | 0.16 |
| Numerical Embodiment 3 | 1.09 | 33.28 | 389.68 | 0.09 |
| Numerical Embodiment 4 | 0.23 | 34.06 | −83.90 | 0.41 |

Next, an exemplary embodiment of a single-lens reflex camera system using a zoom lens system of at least one exemplary embodiment will now be described with reference to FIG. 10. In FIG. 10, reference numeral 10 denotes a main body of a single-lens reflex camera, and reference numeral 11 denotes an interchangeable lens including the zoom lens system according to an exemplary embodiment. Reference numeral 12 denotes a light-sensitive plane where an image sensor (e.g., a solid-state image sensor, a photoelectric transducer, a CCD sensor, a CMOS sensor, a silver salt film, other imaging surfaces as known by one of ordinary skill in the relevant art, and equivalents) is placed. Reference numeral 13 denotes a finder optical system for observing an object image coming from the interchangeable lens 11. Reference numeral 14 denotes a swingable quick return mirror for switching between image transmission to the light-sensitive plane 12 and image transmission to the finder optical system 13. When observing the object image with the finder, the object image reflected by the quick return mirror 14 and focused onto a focusing glass 15 is converted into an erected image by a pentagonal prism 16, and then magnified by an eyepiece optical system 17. When shooting, the quick return mirror 14 swings in the direction of the arrow, and the object image is focused onto the light-sensitive plane 12 and recorded. Reference numeral 18 denotes a submirror, and reference numeral 19 denotes a focal point detector.

When the zoom lens system of at least one exemplary embodiment is used for an optical apparatus such as a single-lens reflex camera, the optical apparatus can have improved optical performance.

The zoom lens system of exemplary embodiments can also be used for a single-lens reflex camera without a quick return mirror.

As described above, when a zoom lens, in accordance with at least one exemplary embodiment, is used for an image pickup apparatus (e.g., a photographic camera, a camcorder, an electronic still camera, a digital camera, or a 3-CCD electronic camera, other image pick up apparatus as known by one of ordinary skill in the relevant art, and equivalents), blurring of images due to vibration or tilting of the zoom lens can be reduced optically by moving a portion (e.g., L4a) of the zoom lens in a direction where the direction has a projection perpendicular to the optical axis.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-223788 filed Jul. 30, 2004, which is hereby incorporated by reference herein in its entirety.

What is claimed is:

1. A zoom lens system comprising from the object side to the image side:
a first lens unit having positive optical power;
a second lens unit having negative optical power;
a third lens unit having positive optical power;
a fourth lens unit having negative optical power; and
a fifth lens unit having positive optical power, the fifth lens unit consisting of an aspherical lens having positive optical power and a combination lens,
wherein when zooming, each lens unit moves such that a distance between two adjacent lens units changes and wherein a radius of curvature of the image-side surface of the aspherical lens (R1) and a radius of curvature of the object-side surface of the combination lens (R2) satisfy the following condition:

$$0.1 \leq |R1-R2/R1+R2|.$$

2. The zoom lens system according to claim 1, wherein the combination lens as a whole has negative optical power.

3. The zoom lens system according to claim 2, wherein an optical power of the fifth lens unit ($\phi 5$) and an optical power of the combination lens ($\phi 5b$) satisfy the following condition:

$$0.02 < \left|\frac{\phi 5b}{\phi 5}\right|.$$

4. The zoom lens system according to claim 1, wherein an optical power of the fifth lens unit ($\phi 5$) and an optical power of the combination lens ($\phi 5b$) satisfy the following condition:

$$\left|\frac{\phi 5b}{\phi 5}\right| < 0.5.$$

5. The zoom lens system according to claim 1, wherein the aspherical lens has a biconvex shape, and the combination lens includes a positive lens and a negative lens.

6. The zoom lens system according to claim 1,
wherein the fourth lens unit includes a first lens subunit having negative optical power and a second lens subunit having negative optical power, and
wherein the position of image formed by the zoom lens system is changed by moving the first lens subunit in a direction that has a projection that is perpendicular to an optical axis.

7. The zoom lens system according to claim 1, wherein the zoom lens system forms an image on a solid-state image sensor.

8. An image pickup apparatus comprising:
the zoom lens system according to claim 1; and
a solid-state image sensor sensing an image formed by the zoom lens system.

9. The zoom lens system according to claim 1, wherein the aspherical lens is made of a low dispersion material.

10. The zoom lens system according to claim 1, further comprising:
an optical element positioned between the first lens unit and the fifth lens unit, wherein the optical element is one of an optical filter and a small refractive power lens.

11. The zoom lens system according to claim 1, wherein the second lens unit is configured to move toward the image side when focusing on an object at a distant point to an object at a short distance.

12. The zoom lens system according to claim 1, wherein a radius of curvature of the image-side surface of the aspherical lens (R1) and a radius of curvature of the object-side surface of the combination lens (R2) satisfy the following condition:

$$\left|\frac{R1-R2}{R1+R2}\right| \leq 3.$$

13. An imaging system comprising:
the zoom lens system according to claim 1; and
an imaging device,
wherein the zoom lens system is operatively connected to the imaging device, and the imaging device is one of an electronic camera, a camcorder, a digital still camera, a film camera, and a broadcast camera.

14. A zoom lens system comprising from the object side to the image side:
a first lens unit having positive optical power;
a second lens unit having negative optical power;
a third lens unit having positive optical power;
a fourth lens unit having negative optical power; and
a fifth lens unit having positive optical power, the fifth lens unit consisting of
an aspherical lens having positive optical power and a combination lens,
wherein when zooming, each lens unit moves such that a distance between two adjacent lens units changes, and wherein an optical power of the fifth lens unit (φ5) and an optical power of the combination lens (φ5b) satisfy the following condition:

$$\left|\frac{\phi 5b}{\phi 5}\right| < 0.5.$$

15. A zoom lens system comprising from the object side to the image side:
   a first lens unit having positive optical power;
   a second lens unit having negative optical power;
   a third lens unit having positive optical power;
   a fourth lens unit having negative optical power; and
   a fifth lens unit having positive optical power, the fifth lens unit consisting of an aspherical lens having positive optical power and a combination lens,
   wherein when zooming, each lens unit moves such that a distance between two adjacent lens units changes,
   wherein the fourth lens unit includes a first lens subunit having negative optical power and a second lens subunit having negative optical power, and
   wherein the position of image formed by the zoom lens system is changed by moving the first lens subunit in a direction that has a projection that is perpendicular to an optical axis.

16. A zoom lens system comprising from the object side to the image side:
   a first lens unit having positive optical power;
   a second lens unit having negative optical power;
   a third lens unit having positive optical power;
   a fourth lens unit having negative optical power; and
   a fifth lens unit having positive optical power, the fifth lens unit consisting of an aspherical lens having positive optical power and a combination lens,
   wherein when zooming, each lens unit moves such that a distance between two adjacent lens units changes, and
   wherein a radius of curvature of the image-side surface of the aspherical lens (R1) and a radius of curvature of the object-side surface of the combination lens (R2) satisfy the following condition:

$$\left|\frac{R1-R2}{R1+R2}\right| \leq 3.$$

17. A zoom lens system comprising from the object side to the image side:
   a first lens unit having positive optical power;
   a second lens unit having negative optical power;
   a third lens unit having positive optical power;
   a fourth lens unit having negative optical power; and
   a fifth lens unit having positive optical power, the fifth lens unit consisting of an aspherical lens having positive optical power and a combination lens,
   wherein when zooming, each lens unit moves such that a distance between two adjacent lens units changes, and
   wherein an optical power of the fifth lens unit (θ5b) satisfy the following condition:

$0.02 < |\theta 5b/\theta 5|$.

* * * * *